(12) United States Patent
Matsuda

(10) Patent No.: US 12,000,318 B2
(45) Date of Patent: Jun. 4, 2024

(54) EXHAUST MUFFLER SUPPORTING STRUCTURE

(71) Applicant: SUBARU CORPORATION, Tokyo (JP)

(72) Inventor: Takuma Matsuda, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/942,718

(22) Filed: Sep. 12, 2022

(65) Prior Publication Data

US 2023/0089538 A1  Mar. 23, 2023

(30) Foreign Application Priority Data

Sep. 21, 2021  (JP) ................. 2021-153533

(51) Int. Cl.
*B60C 19/08* (2006.01)
*B60K 13/04* (2006.01)
*F01N 13/08* (2010.01)
*F01N 13/18* (2010.01)

(52) U.S. Cl.
CPC .......... *F01N 13/1822* (2013.01); *B60K 13/04* (2013.01); *F01N 13/08* (2013.01)

(58) Field of Classification Search
CPC ...... F01N 13/1822; F01N 13/08; B60K 13/04
See application file for complete search history.

(56) References Cited

U.S. PATENT DOCUMENTS

| 7,575,216 | B2* | 8/2009 | Zimmermann | F16F 1/46 248/610 |
| 7,637,472 | B2* | 12/2009 | Endo | F16F 1/373 267/293 |
| 8,376,331 | B2* | 2/2013 | Rodecker | F16F 3/0873 267/141.1 |
| 9,470,134 | B2* | 10/2016 | Hirukawa | B60K 13/04 |
| 10,196,959 | B2* | 2/2019 | Tanahashi | H05F 3/00 |
| 11,047,289 | B2* | 6/2021 | Yamazaki | B60K 13/04 |
| 11,598,385 | B2* | 3/2023 | Steinmaier | F01N 13/1811 |

(Continued)

FOREIGN PATENT DOCUMENTS

JP  2002-160536 A  6/2002

*Primary Examiner* — Amy J. Sterling
(74) *Attorney, Agent, or Firm* — MCGINN I.P. LAW GROUP, PLLC

(57) ABSTRACT

An exhaust muffler supporting structure includes left and right vehicle body-side hangers, left and right muffler-side hangers, suspending hooks, suspended hooks, and left and right cushion members. The vehicle body-side hangers extend from a bottom of a vehicle body. The muffler-side hangers are fixed to an exhaust system body. The suspending hooks are disposed respectively on the vehicle body-side hangers. The suspended hooks are disposed respectively on the muffler-side hangers. The cushion members each have first and second hook holes into which a corresponding one of the suspending hooks and a corresponding one of the suspended hooks are inserted respectively. The first and second hook holes are disposed on respective sides of each of the cushion members in a main axis direction. An elastic main axis obtained based on characteristics of the cushion members is set on a gravity center position of the exhaust system body.

20 Claims, 4 Drawing Sheets

(56) References Cited

U.S. PATENT DOCUMENTS

| | | | |
|---|---|---|---|
| 2004/0089493 A1* | 5/2004 | Chae | F01N 13/1822 180/309 |
| 2021/0262380 A1* | 8/2021 | Garcia Ramirez | F16L 27/1004 |
| 2022/0010717 A1* | 1/2022 | Azpiazu Echave | F01N 13/1822 |
| 2023/0044457 A1* | 2/2023 | Havener | F16F 1/3732 |

* cited by examiner

EXHAUST MUFFLER SUPPORTING STRUCTURE

CROSS-REFERENCE TO RELATED APPLICATIONS

The present application claims priority from Japanese Patent Application No. 2021-153533 filed on Sep. 21, 2021, the entire contents of which are hereby incorporated by reference.

BACKGROUND

The disclosure relates to an exhaust muffler supporting structure in which an exhaust muffler is supported on a vehicle body frame by a cushion member.

In the related art, in a vehicle such as an automobile, when an exhaust pipe and a muffler are supported at the bottom of a vehicle body, the exhaust pipe and the muffler are suspended under the floor of the vehicle body by a cushion member, so that vibration and shaking of an exhaust system are reduced, and vibration transmission to the vehicle body is reduced. The exhaust pipe and the muffler are parts of the exhaust system. In order to efficiently block the vibration transmission to the vehicle body, it is advantageous to set a spring constant of the cushion member to be low (to increase the flexibility).

When a vehicle changes lanes during travel or travels on a winding road, inertial force acts on the exhaust system due to a lateral movement acting on the vehicle. If the spring constant is set to be low, the exhaust system receives the inertial force and tends to be greatly swung outward. As a result, the lateral movement acting on the exhaust muffler is delayed with respect to the vehicle, follow-up responsiveness deteriorates, and the vibration of the exhaust muffler affects the vehicle behavior.

As a countermeasure, for example, Japanese Unexamined Patent Application Publication (JP-A) No. 2002-160536 discloses a technique in which a muffler-side hanger disposed on an exhaust muffler and a vehicle body-side hanger that suspends the muffler-side hanger by a cushion member are supported at a gravity center position of the exhaust muffler.

SUMMARY

An aspect of the disclosure provides an exhaust muffler supporting structure including a left vehicle body-side hanger and a right vehicle body-side hanger in pairs, a left muffler-side hanger and a right muffler-side hanger in pairs, suspending hooks, suspended hooks, a left cushion member, and a right cushion member. The left vehicle body-side hanger and the right vehicle body-side hanger extend from a bottom of a vehicle body of a vehicle. The left muffler-side hanger and the right muffler-side hanger are fixed to an exhaust system body of the vehicle. The suspending hooks are disposed respectively on the left vehicle body-side hanger and the right vehicle body-side hanger. The suspended hooks are disposed respectively on the left muffler-side hanger and the right muffler-side hanger. The left cushion member and the right cushion members each have a first hook hole into which a corresponding one of the suspending hooks is inserted and a second hook hole into which a corresponding one of the suspended hooks is inserted. The first hook hole and the second hook hole are disposed on respective sides of each of the left cushion member and the right cushion member in a main axis direction. An elastic main axis obtained based on a characteristic of the left cushion member and a characteristic of the right cushion member is set on a gravity center position of the exhaust system body.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

DETAILED DESCRIPTION

In the suspension structure of the exhaust muffler disclosed in the above-described document, the exhaust muffler is supported at the gravity center position, and thus support balance is good and a movement of the exhaust muffler can be restrained.

However, in this technique, a mounting position of the muffler-side hanger and the vehicle body-side hanger is determined based on the gravity center position of the exhaust muffler, and thus the degree of freedom when laying out the exhaust muffler on the vehicle is limited. On the contrary, when layout of the exhaust muffler is prioritized, the degree of freedom in design of the vehicle is limited.

It is desirable to provide an exhaust muffler supporting structure that can reduce vibration due to inertial force acting on an exhaust muffler without limiting the degree of freedom in layout of the exhaust muffler and design of a vehicle body.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
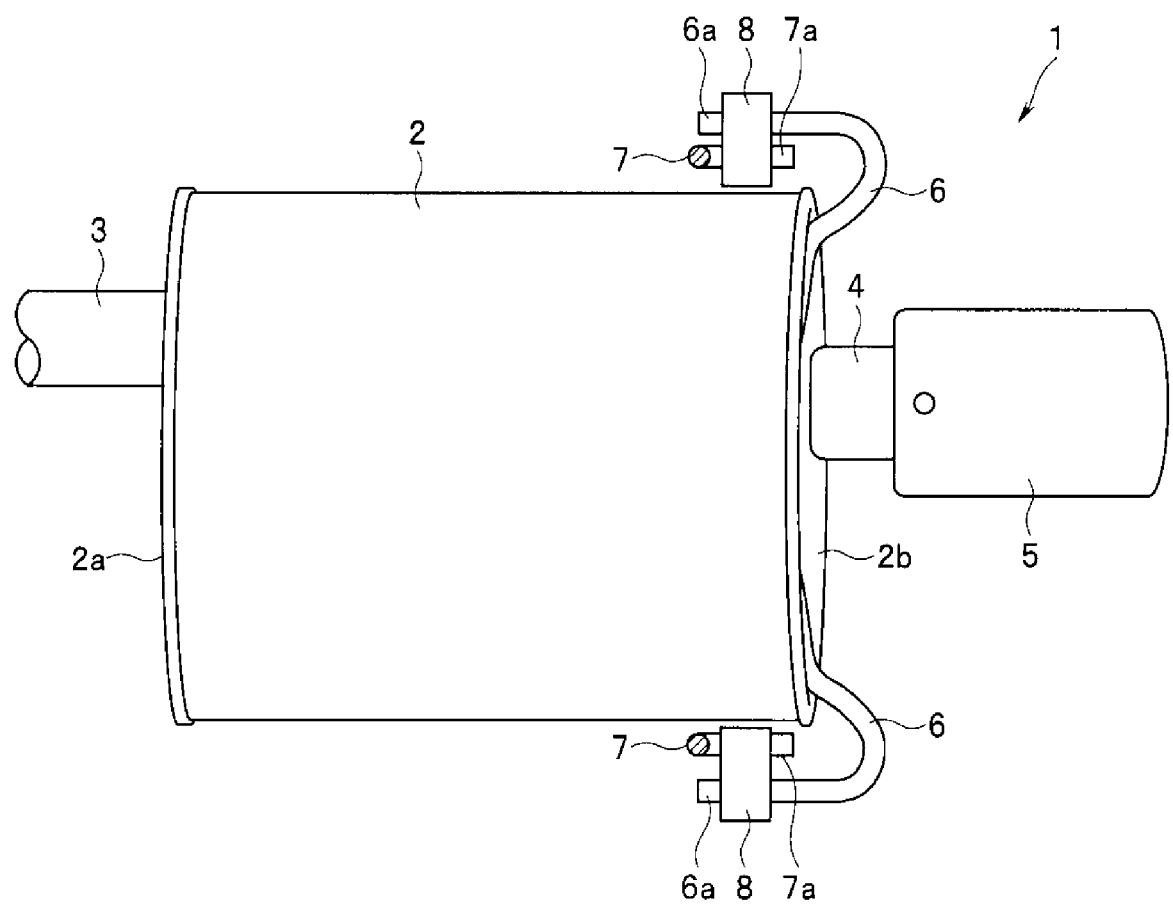
FIG. 1 is a plan view illustrating an exhaust muffler supporting structure.
Figure 2:
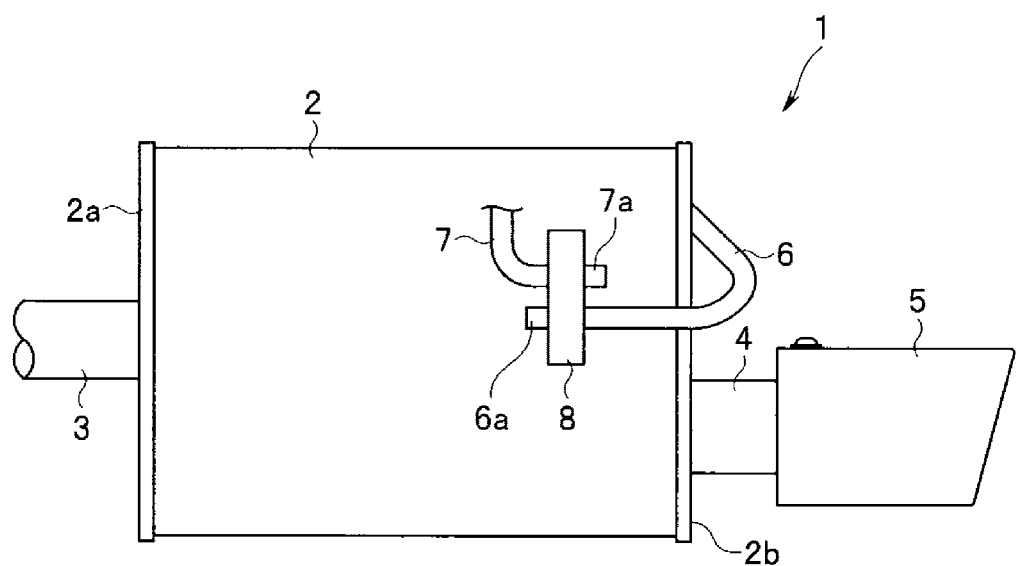
FIG. 2 is a side view illustrating the exhaust muffler supporting structure.

Reference numeral 1 in FIGS. 1 and 2 represents an exhaust muffler. The exhaust muffler 1 is disposed at a rear end of an exhaust system. The exhaust system extends from an engine mounted on the front of a vehicle to the rear of the vehicle through the bottom of the vehicle. A muffler pipe 3 is provided in the exhaust system. The muffler pipe 3 communicates with a front end surface 2a (exhaust gas inlet side) of a muffler body 2 provided on the exhaust muffler 1. The muffler body 2 is an exhaust system body.

A tail pipe 4 communicates with a rear end surface 2b (exhaust gas outlet side) of the muffler body 2. A muffler cutter 5 is mounted on a rear end of the tail pipe.

Exhaust gas discharged from the engine passes through the exhaust system, and flows into the muffler body 2 from the muffler pipe 3. When the exhaust gas passes through the muffler body 2, exhaust noise of the exhaust gas is muffled. The muffled exhaust gas flows out to the tail pipe 4 and is discharged to the outside from the muffler cutter 5. The muffler body 2 has various cross-sectional shapes such as a circular cross section, an elliptical cross section, and a substantially triangular cross section in relation to the vehicle on which the muffler body 2 is mounted.

A pair of left and right muffler-side hanger stays 6 is disposed on the rear end surface 2b of the muffler body 2. The muffler-side hanger stays 6 are muffler-side hangers. Since the muffler-side hanger stays 6 have shapes that are substantially symmetrical, the same reference numeral will be given for convenience.

Each muffler-side hanger stay 6 is a rod-shaped metal member. One end of the muffler-side hanger stay 6 is bent along an upper edge of the rear end surface 2b, and is joined by, for example, welding. The middle of the other end of the muffler-side hanger stay 6 extends diagonally downward from the rear end surface 2b to the rear side. The other end is bent forward and extends to a position where the other end overlaps with the rear side surface of the muffler body 2, so that a substantially horizontal suspended hook 6a is formed.

A pair of left and right vehicle body-side hanger stays 7 is disposed above a position corresponding to the suspended hooks 6a of the muffler-side hanger stays 6. The vehicle body-side hanger stays 7 have the same shape and are vehicle body-side hangers. Each vehicle body-side hanger stay 7 is formed of a bent rod-shaped metal member. One end of the vehicle body-side hanger stay 7 is fixed to a floor bracket, a floor cross member, or the like on a lower surface of the vehicle by, for example, welding. The middle of the vehicle body-side hanger stay 7 extends downward. The other end includes a suspending hook 7a. The suspending hook 7a bends in an L shape to the rear side of the muffler body 2 and is parallel to the suspended hook 6a of the muffler-side hanger stay 6.

Figure 3:
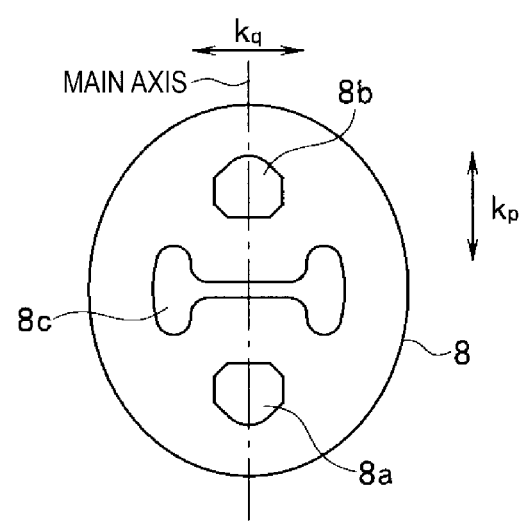
FIG. 3 is a front view of a cushion rubber.

The suspended hook 6a of the muffler-side hanger stay 6 and the suspending hook 7a of the vehicle body-side hanger stay 7 facing the suspended hook 6a are coupled by a cushion rubber 8. The cushion rubber 8 is a cushion member. As illustrated in FIG. 3, the cushion rubber 8 has an elliptical shape with a major axis as a main axis. The cushion rubber 8 has a hook hole 8a and a hook hole 8b on two sides of the main axis. The suspended hook 6a of the muffler-side hanger stay 6 is inserted into the hook hole 8a. The suspending hook 7a of the vehicle body-side hanger stay 7 is inserted into the hook hole 8b. The hook hole 8a is another hook hole. The cushion rubber 8 further has a substantially H-shaped hollow 8c in the center. The movability of the cushion rubber 8 is controlled by the hollow 8c. Although not illustrated, the muffler pipe 3 is supported on the bottom of the vehicle body by another cushion rubber. The muffler pipe 3 is coupled to the front of the muffler body 2.

The shape and layout of the exhaust system vary from vehicle to vehicle. Therefore, the shape of the exhaust muffler 1 and its mounting position with respect to the vehicle also vary depending on the vehicle type. Unlike the related art described above, it is difficult to constantly support the muffler body 2 at a gravity center position W due to layout limitation. The gravity center position W is an inertial subject of the muffler body 2.

Therefore, in the embodiment, characteristics and a mounting position of the cushion rubber 8 are set such that the muffler body 2 can be supported at a position in which the vibration due to the inertial force can be greatly limited while the layout is limited.

That is, the suspended hook 6a of the muffler-side hanger stay 6 and the suspending hook 7a of the vehicle body-side hanger stay 7 are inserted into the hook holes 8a and 8b of the cushion rubber 8, so that the muffler body 2 is suspended from the bottom surface of the vehicle body. The hook holes 8a and 8b are disposed on left and right sides of the muffler body 2, respectively. An elastic main axis X in a load (lateral G) direction is adjusted to pass through the gravity center position W in a front view (or back view) of the muffler body 2. The elastic main axis X is determined by characteristics of the left and right cushion rubbers 8 at that time. The "elastic main axis X" referred to here is a virtual axis in a direction in which a direction in which the load (lateral G) acts on the muffler body 2 coincides with a direction in which the muffler body 2 is displaced due to the elastic deformation of the cushion rubbers 8. No angular displacement occurs in the direction.

Therefore, by setting the elastic main axis at the gravity center position W, the left and right cushion rubbers 8 can support the muffler body 2 in a well-balanced manner, and rotational vibration due to a moment when inertial force from the lateral direction acts on the muffler body 2 is reduced. The gravity center position W is the inertial subject of the muffler body 2. As a result, follow-up responsiveness of the muffler body 2 when lateral acceleration is generated in the vehicle during travel is improved, and the influence on the vehicle behavior can be reduced.

Hereinafter, implementation examples in which the elastic main axis X is adjusted to pass through the gravity center position W of the muffler body 2 will be illustrated based on the positional relationship between the muffler body 2 and the left and right cushion rubbers 8. In the implementation examples, it is assumed that the muffler body 2 is supported in a state of being substantially horizontal to the bottom of the vehicle body. A supporting structure of the muffler body 2 is common among the implementation examples. Further, the left and right cushion rubbers 8 are inclined in directions in which main axis directions thereof are different from each other.

First Implementation Example

Figure 4A:
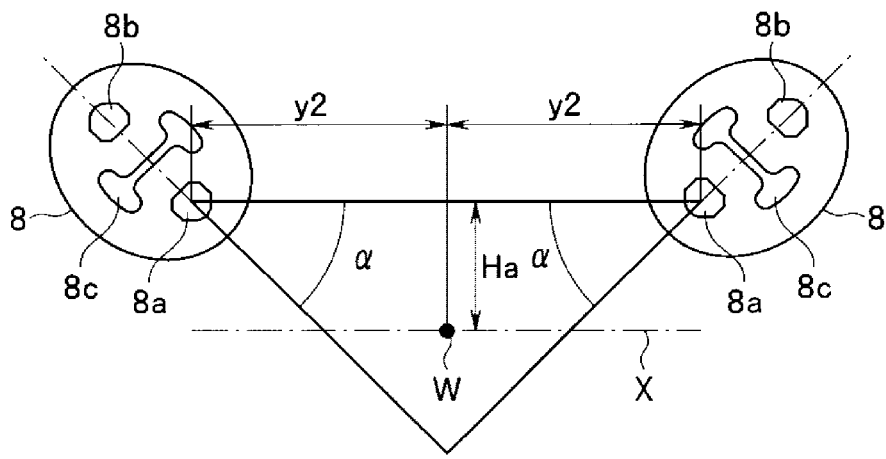
FIG. 4A is a diagram schematically illustrating the exhaust muffler supporting structure according to a first implementation example.

FIG. 4A is a diagram schematically illustrating a supporting position of the muffler body 2 of FIGS. 1 and 2 in a suspended state. The implementation example illustrates a state in which the muffler body 2 is supported at bilaterally symmetric positions by the pair of hanger stays 6, the pair of hanger stays 7, and the cushion rubbers 8. In the implementation example, the gravity center position W of the muffler body 2 is below a line connecting the hook holes 8a of the left and right cushion rubbers 8. The cushion rubbers 8 are inclined at an angle at which the main axes thereof are bilaterally symmetrical and intersect at the lower side.

In the implementation example, when the gravity center position W of the muffler body 2, a distance between the cushion rubbers 8, and inclination of the main axes are predetermined, an inverted isosceles triangle is drawn first. The inverted isosceles triangle has lines connecting the main axes of the left and right cushion rubbers 8 as equal sides and the line connecting centers of the hook holes 8*a* on the muffler side as a base. A length of the base and a base angle α are calculated.

Next, the elastic main axis X is set at a position parallel to the base. The elastic main axis X passes through the gravity center position W. A distance Ha from the elastic main axis X to the base is calculated. A spring constant kp in the main axis direction of the cushion rubbers 8 and a spring constant kq in a shearing direction orthogonal to the main axial direction are calculated from the following equation (1).

$$Ha=(kp-kq)\cdot y2\cdot \sin\alpha\cdot \cos\alpha/(kp\cdot \cos^2\alpha+kq\cdot \cos^2\alpha) \qquad (1)$$

Here, y2 is ½ of the length of the base.

Since the direction in which the load (lateral G) acts on the muffler body 2 coincides with the direction in which the muffler body 2 is displaced due to the elastic deformation of the cushion rubber 8, the moment when the inertial force acts on the muffler body 2 is reduced, and the rotational vibration of the muffler body 2 is reduced.

In this implementation example and second to fifth implementation examples described below, a vertex angle does not have to be a right angle. The gravity center position W is on the elastic main axis X. As illustrated in the drawings, when the gravity center position W is set at a position orthogonal to the elastic main axis X at ½ of the length of the line connecting the left and right hook holes 8*a*, the muffler body 2 can be supported in a more balanced manner.

Second Implementation Example

Figure 4B:
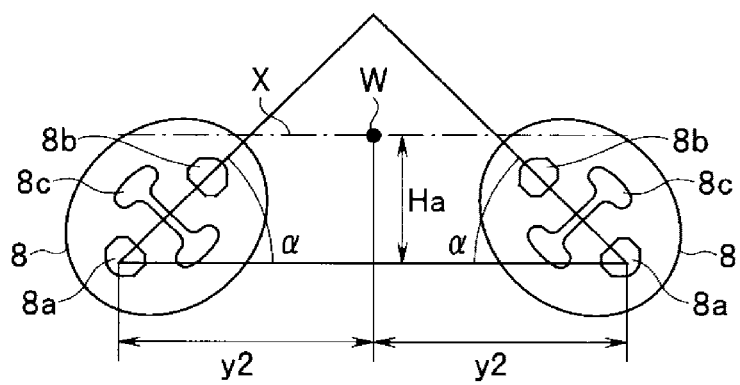
FIG. 4B is a diagram schematically illustrating the exhaust muffler supporting structure according to a second implementation example.

FIG. 4B illustrates the second implementation example. In the implementation example, in contrast to the first implementation example illustrated in FIG. 4A, the gravity center position W of the muffler body 2 is set above the line connecting the hook holes 8*a* of the left and right cushion rubbers 8, and the cushion rubbers 8 are inclined in a direction in which extensions of the main axes of the cushion rubbers 8 intersect at the upper side.

In this case, similar to the first implementation example described above, when the gravity center position W of the muffler body 2, the distance between the cushion rubbers 8, and inclination of the main axes are predetermined, an isosceles triangle is drawn first. The isosceles triangle has lines extending and connecting the main axes of the left and right cushion rubbers 8 as equal sides and the line connecting the centers of the hook holes 8*a* on the muffler side as a base. The length of the base and the base angle α are calculated. The spring constants kp and kq of the cushion rubber 8 are set based on the distance Ha from the elastic main axis X to the base. The elastic main axis X passes through the gravity center position W.

Third Implementation Example

Figure 4C:
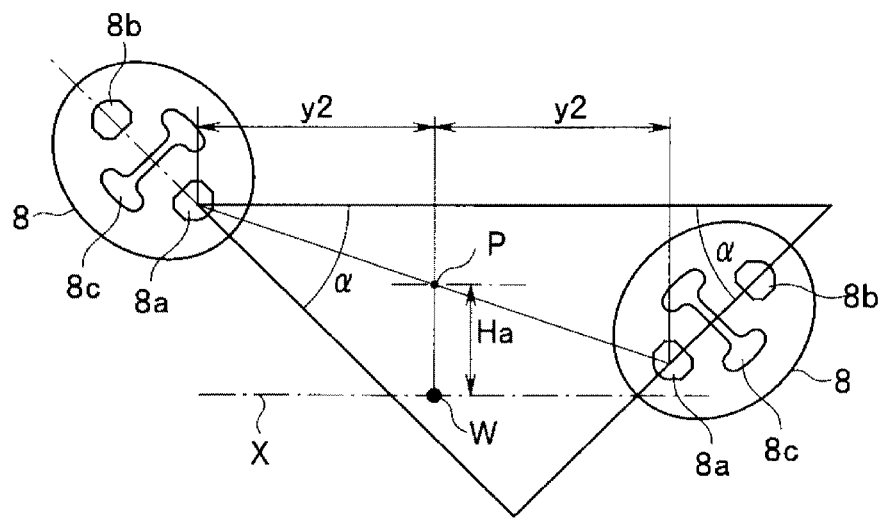
FIG. 4C is a diagram schematically illustrating the exhaust muffler supporting structure according to a third implementation example.

FIG. 4C illustrates the third implementation example. As illustrated in FIG. 4C, when the left and right cushion rubbers 8 differ in inclination and position and drawing is performed based on the line connecting the centers of the hook holes 8*a* of the left and right cushion rubbers 8 and the inclination of the main axes, the line connecting the centers of the hook holes 8*a* is not always a base of an isosceles triangle. In the implementation example, the gravity center position W of the muffler body 2 is below the line connecting the hook holes 8*a* of the left and right cushion rubbers 8.

In such a case, an isosceles triangle is drawn first. The isosceles triangle has a vertex angle defined by extensions of the main axes of the left and right cushion rubbers 8, a vertex at which extensions of the main axes of the left and right cushion rubbers 8 intersect, and equal sides defined by a longer one of lines from the vertex to the hook holes 8*a* of the cushion rubbers 8. The distance between the left and right hook holes 8*a* on the base and the base angle α are calculated. Next, the elastic main axis X is drawn. The elastic main axis X is parallel to the base of the isosceles triangle and passes through the gravity center position W.

A perpendicular line is drawn from a position of the length y2 to the elastic main axis X. The length y2 is ½ of the distance between the left and right hook holes 8*a* on the base. The distance Ha from an intersection P of the line connecting the hook holes 8*a* of the left and right cushion rubbers 8 and the perpendicular line to the elastic main axis X is calculated. The spring constants kp and kq of the cushion rubber 8 are set from equation (1).

Fourth Implementation Example

Figure 4D:
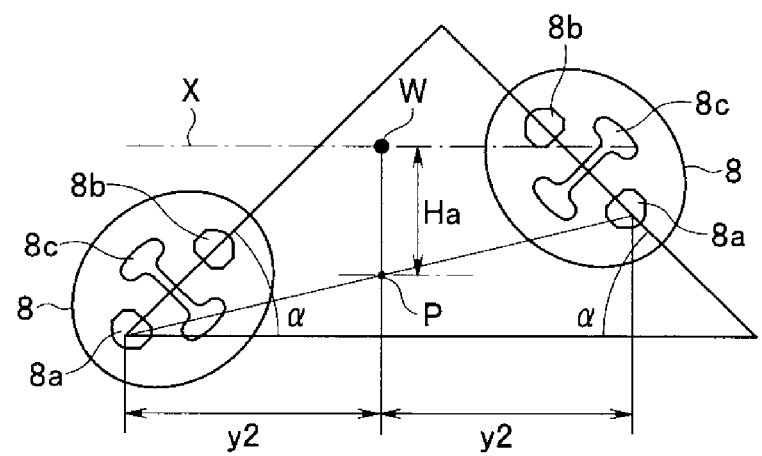
FIG. 4D is a diagram schematically illustrating the exhaust muffler supporting structure according to a fourth implementation example.

FIG. 4D illustrates the fourth implementation example. This implementation example is similar to the third implementation example, and describes a case in which the line connecting the centers of the hook holes 8*a* is not the base of the isosceles triangle because the left and right cushion rubbers 8 differ in inclination and position. In the implementation example, the gravity center position W of the muffler body 2 is above the line connecting the hook holes 8*a* of the left and right cushion rubbers 8.

In such a case, an isosceles triangle is drawn first. The isosceles triangle has a vertex angle defined by the extensions of the main axes of the left and right cushion rubbers 8, a vertex at which extensions of the main axes of the left and right cushion rubbers 8 intersect, and equal sides defined by a longer one of the lines connecting the vertex and the hook holes 8*a* of the cushion rubbers 8. The base angle α and the distance between left and right hook holes 8*a* on the base are calculated. Next, the elastic main axis X is drawn. The elastic main axis X is parallel to the base of the isosceles triangle and passes through the gravity center position W.

A perpendicular line is drawn from ½ of the distance between the left and right hook holes 8*a* on the base to the elastic main axis X. The distance Ha from the intersection P of the line connecting the hook holes 8*a* of the left and right cushion rubbers 8 and the perpendicular line to the elastic main axis X is calculated. The spring constants kp and kq of the cushion rubber 8 are set from equation (1).

Fifth Implementation Example

Figure 4E:
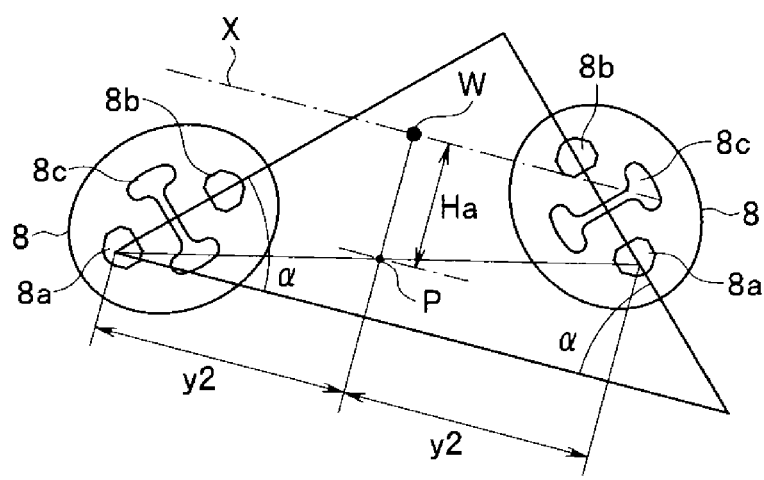
FIG. 4E is a diagram schematically illustrating the exhaust muffler supporting structure according to a fifth implementation example.

FIG. 4E illustrates the fifth implementation example. Even when the line connecting the hook holes 8*a* of the left and right cushion rubbers 8 is horizontal and the distance Ha to the elastic main axis X is calculated, the base of an isosceles triangle is not always horizontal if the left and right cushion rubbers 8 differ in inclination and position. In the implementation example, the gravity center position W of the muffler body 2 is above the line connecting the hook holes 8a of the left and right cushion rubbers 8.

In such a case, an isosceles triangle is drawn first. The isosceles triangle has a vertex angle defined by the extensions of the main axes of the left and right cushion rubbers 8, a vertex at which extensions of the main axes of the left and right cushion rubbers 8 intersect, and equal sides defined by a longer one of the lines connecting the vertex and the hook holes 8a of the cushion rubbers 8. The base angle α and the distance between left and right hook holes 8a on the base are calculated. Next, the elastic main axis X is drawn. The elastic main axis X is parallel to the base of the isosceles triangle and passes through the gravity center position W.

A perpendicular line is drawn from ½ of the distance between the left and right hook holes 8a on the base to the elastic main axis X. The distance Ha from the intersection P of the line connecting the hook holes 8a of the left and right cushion rubbers 8 and the perpendicular line to the elastic main axis X is calculated. The spring constants kp and kq of the cushion rubber 8 are set from equation (1).

In the implementation example, the elastic main axis X is inclined, and thus when the lateral G acts on the muffler body 2, the muffler body 2 generates inertial force in an inclined direction along the elastic main axis X. The rotational vibration can be reduced because the moment in the rotational direction is small.

As described above, in the embodiment, the characteristics of the left and right cushion rubbers 8 are set based on equation (1) such that the elastic main axis X passes through the gravity center position W of the muffler body 2. Accordingly, a direction of force applied from the muffler body 2 to the cushion rubber 8 in the main axis direction and the shearing direction of the cushion rubber 8 can coincide with the direction in which the cushion rubber 8 is elastically displaced without limiting the degree of freedom in the layout of the exhaust muffler 1 and the design of the vehicle body.

As a result, the inertial force of the muffler body 2 can be reduced, the influence on the vehicle behavior when the vehicle changes lanes during travel or travels on a winding road can be reduced, and good traveling performance can be obtained. The spring constant of the cushion rubber 8 may be made relatively small, and the transmission of vibration to the vehicle body can be efficiently cut off.

The disclosure is not limited to the above-described embodiment, and for example, the muffler-side hanger stay 6 may be fixed to the front end surface 2a of the muffler body 2.

In the above-described implementation examples, the spring constants kp and kq included in equation (1) are described as unknown values. However, the elastic main axis X passing through the gravity center position W may be set with the other elements Ha, y2 and a as unknown values.

According to the disclosure, the elastic main axis obtained based on the characteristics of the left and right cushion members is set on the gravity center position of the exhaust system body, and thus the vibration due to the inertial force acting on the exhaust muffler can be reduced without limiting the degree of freedom in the layout of the exhaust muffler and the design of the vehicle body.

The invention claimed is:

1. An exhaust muffler supporting structure comprising:
    a left vehicle body-side hanger and a right vehicle body-side hanger in pairs, the left vehicle body-side hanger and the right vehicle body-side hanger extending from a bottom of a vehicle body of a vehicle;
    a left muffler-side hanger and a right muffler-side hanger in pairs, the left muffler-side hanger and the right muffler-side hanger being fixed to an exhaust system body of the vehicle;
    suspending hooks disposed respectively on the left vehicle body-side hanger and the right vehicle body-side hanger;
    suspended hooks disposed respectively on the left muffler-side hanger and the right muffler-side hanger; and
    a left cushion member and a right cushion member each having a first hook hole into which a corresponding one of the suspending hooks is inserted and a second hook hole into which a corresponding one of the suspended hooks is inserted, the first hook hole and the second hook hole being disposed on respective sides of each of the left cushion member and the right cushion member in a main axis direction, wherein
    wherein the left cushion member and the right cushion member are configured, such that an elastic main axis obtained based on a characteristic of the left cushion member and a characteristic of the right cushion member is set on a gravity center position of the exhaust system body.

2. The exhaust muffler supporting structure according to claim 1, wherein
    the characteristic of the left cushion member and the characteristic of the right cushion member are determined at least by a spring constant in the main axis direction and a spring constant in a shearing direction orthogonal to the main axis direction.

3. The exhaust muffler supporting structure according to claim 1, wherein
    the characteristic of the left cushion member and the characteristic of the right cushion member are determined at least by an inclination angle of each of the left cushion member and the right cushion member in the main axis direction, with the gravity center position interposed therebetween.

4. The exhaust muffler supporting structure according to claim 2, wherein
    the characteristic of the left cushion member and the characteristic of the right cushion member are determined further by an inclination angle of each of the left cushion member and the right cushion member in the main axis direction, with the gravity center position interposed therebetween.

5. The exhaust muffler supporting structure according to claim 1, wherein
    the characteristic of the left cushion member and the characteristic of the right cushion member are determined at least by a distance between the second hook hole of the left cushion member and the second hook hole of the right cushion member.

6. The exhaust muffler supporting structure according to claim 2, wherein
    the characteristic of the left cushion member and the characteristic of the right cushion member are determined at least by a distance between the second hook hole of the left cushion member and the second hook hole of the right cushion member.

7. The exhaust muffler supporting structure according to claim 3, wherein
    the characteristic of the left cushion member and the characteristic of the right cushion member are determined at least by a distance between the second hook hole of the left cushion member and the second hook hole of the right cushion member.

8. The exhaust muffler supporting structure according to claim 4, wherein
the characteristic of the left cushion member and the characteristic of the right cushion member are determined at least by a distance between the second hook hole of the left cushion member and the second hook hole of the right cushion member.

9. The exhaust muffler supporting structure according to claim 1, wherein
the elastic main axis is set parallel to a base of an isosceles triangle comprising equal sides that are an extension line of inclination of a main axe of the left cushion member and an extension line of inclination of a main axe of the right cushion member, and
a distance from an intersection of a line that is orthogonal to the base and intersects the elastic main axis and a line connecting the second hook hole of the left cushion member and the second hook hole of the right cushion member to the elastic main axis is calculated from $Ha=(kp-kg)\cdot y2\cdot \sin\alpha\cdot \cos\alpha/(kp\cdot \cos^2\alpha+kq\cdot \cos^2\alpha)$, in which Ha is the distance; kp is a spring constant in the main axis direction; kq is a spring constant in a shearing direction; and y2 is a length of ½ of a distance between the second hook hole of the left cushion member and the second hook hole of the right cushion member.

10. A vehicle comprising the exhaust muffler supporting structure according to claim 1.

11. An exhaust muffler supporting structure comprising:
a first vehicle body-side hanger and a second vehicle body-side hanger in pairs, the first vehicle body-side hanger and the second vehicle body-side hanger extending from a bottom of a vehicle body of a vehicle;
a first muffler-side hanger and a second muffler-side hanger in pairs, the first muffler-side hanger and the second muffler-side hanger being fixed to an exhaust system body of the vehicle;
suspending hooks disposed respectively on the first vehicle body-side hanger and the second vehicle body-side hanger;
suspended hooks disposed respectively on the first muffler-side hanger and the second muffler-side hanger; and
a first cushion member including a first resilient element and a second cushion member including a second resilient element, each having a first hook hole into which a corresponding one of the suspending hooks is inserted and a second hook hole into which a corresponding one of the suspended hooks is inserted, the first hook hole and the second hook hole being disposed on respective sides of each of the first cushion member and the second cushion member in a main axis direction, wherein
wherein the first cushion member and the second cushion member are configured, such that an elastic main axis, determined based on a characteristic of the first cushion member and a characteristic of the second cushion member, is adjusted to pass through a gravity center position of the exhaust system body.

12. The exhaust muffler supporting structure according to claim 11, wherein
the characteristic of the first cushion member and the characteristic of the second cushion member are determined at least by a spring constant in the main axis direction and a spring constant in a shearing direction orthogonal to the main axis direction.

13. The exhaust muffler supporting structure according to claim 11, wherein
the characteristic of the first cushion member and the characteristic of the second cushion member are determined at least by an inclination angle of each of the first cushion member and the second cushion member in the main axis direction, with the gravity center position interposed therebetween.

14. The exhaust muffler supporting structure according to claim 12, wherein
the characteristic of the first cushion member and the characteristic of the second cushion member are determined further by an inclination angle of each of the first cushion member and the second cushion member in the main axis direction, with the gravity center position interposed therebetween.

15. The exhaust muffler supporting structure according to claim 11, wherein
the characteristic of the first cushion member and the characteristic of the second cushion member are determined at least by a distance between the second hook hole of the first cushion member and the second hook hole of the second cushion member.

16. The exhaust muffler supporting structure according to claim 12, wherein
the characteristic of the first cushion member and the characteristic of the second cushion member are determined at least by a distance between the second hook hole of the first cushion member and the second hook hole of the second cushion member.

17. The exhaust muffler supporting structure according to claim 13, wherein
the characteristic of the first cushion member and the characteristic of the second cushion member are determined at least by a distance between the second hook hole of the first cushion member and the second hook hole of the second cushion member.

18. The exhaust muffler supporting structure according to claim 14, wherein
the characteristic of the first cushion member and the characteristic of the second cushion member are determined at least by a distance between the second hook hole of the first cushion member and the second hook hole of the second cushion member.

19. The exhaust muffler supporting structure according to claim 11, wherein
the elastic main axis is set parallel to a base of an isosceles triangle comprising equal sides that are an extension line of inclination of a main axe of the first cushion member and an extension line of inclination of a main axe of the second cushion member, and
a distance from an intersection of a line that is orthogonal to the base and intersects the elastic main axis and a line connecting the second hook hole of the first cushion member and the second hook hole of the second cushion member to the elastic main axis is calculated from $Ha=(kp-kg)\cdot y2\cdot \sin\alpha\cdot \cos\alpha/(kp\cdot \cos^2\alpha+kq\cdot \cos^2\alpha)$, in which Ha is the distance; kp is a spring constant in the main axis direction; kq is a spring constant in a shearing direction; and y2 is a length of ½ of a distance between the second hook hole of the first cushion member and the second hook hole of the second cushion member.

20. A vehicle comprising the exhaust muffler supporting structure according to claim 11.

* * * * *